United States Patent
Bostick et al.

(10) Patent No.: US 10,264,054 B2
(45) Date of Patent: Apr. 16, 2019

(54) PREDICTIVE DEVICE TO DEVICE FILE TRANSFER SYSTEM FOR LOCAL CLOUD STORAGE FILES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 239 days.

(21) Appl. No.: 15/429,368

(22) Filed: Feb. 10, 2017

(65) Prior Publication Data
US 2018/0234481 A1    Aug. 16, 2018

(51) Int. Cl.
| | | |
|---|---|---|
| G06F 15/167 | (2006.01) | |
| H04L 29/08 | (2006.01) | |
| H04W 4/06 | (2009.01) | |
| H04W 4/029 | (2018.01) | |

(52) U.S. Cl.
CPC .......... *H04L 67/06* (2013.01); *H04L 67/1095* (2013.01); *H04L 67/1097* (2013.01); *H04L 67/18* (2013.01); *H04W 4/029* (2018.02); *H04W 4/06* (2013.01)

(58) Field of Classification Search
USPC ....... 709/203, 206, 213, 214, 215, 216, 217, 709/219, 223, 224, 226, 228, 230, 232, 709/238; 707/640; 713/165, 168; 725/14
See application file for complete search history.

(56) References Cited

U.S. PATENT DOCUMENTS

| | | | |
|---|---|---|---|
| 7,463,890 B2 | 12/2008 | Herz et al. | |
| 8,762,456 B1* | 6/2014 | Chan | G06F 17/30011 709/217 |
| 8,849,761 B2* | 9/2014 | Prahlad | G06F 17/302 707/640 |
| 8,849,955 B2* | 9/2014 | Prahlad | G06F 17/302 709/214 |
| 9,374,280 B2 | 6/2016 | Misra et al. | |
| 9,386,092 B1 | 7/2016 | Bhattacharyya et al. | |
| 9,420,041 B2 | 8/2016 | Balasubramanian et al. | |
| 9,811,329 B2* | 11/2017 | Chan | G06F 17/30011 |
| 2010/0257142 A1 | 10/2010 | Murphy et al. | |
| 2011/0065424 A1 | 3/2011 | Estevez et al. | |
| 2013/0117240 A1 | 5/2013 | Taylor et al. | |

(Continued)

*Primary Examiner* — Quang N Nguyen
(74) *Attorney, Agent, or Firm* — Yee & Associates, P.C.; Brian Restauro

(57) ABSTRACT

A method, system, and computer program product for transferring files. The system provides for a data transfer system comprising a processor unit and a data transfer manager. The method identifies a group of local copies of files, in a cloud storage system, that are stored in a group of mobile devices. The method then tracks a location of the group of mobile devices and provides a report of availability of the group of local copies of files on the cloud storage service based on an identification of the group of local copies of files on the cloud storage service that are stored in the group of mobile devices and the location of the group of mobile devices.

14 Claims, 8 Drawing Sheets

(56) References Cited

U.S. PATENT DOCUMENTS

| | | | | |
|---|---|---|---|---|
| 2015/0012495 A1* | 1/2015 | Prahlad | ............ | G06F 17/30082 |
| | | | | 707/640 |
| 2015/0154418 A1* | 6/2015 | Redberg | ............ | G06F 17/30106 |
| | | | | 713/165 |
| 2016/0057472 A1* | 2/2016 | Gupta | ................ | G06Q 30/0235 |
| | | | | 725/14 |
| 2016/0149699 A1* | 5/2016 | Gauda | ................ | G06F 21/6218 |
| | | | | 713/168 |
| 2016/0154418 A1* | 6/2016 | Augesky | ............... | H02M 3/156 |
| | | | | 323/315 |

* cited by examiner

PREDICTIVE DEVICE TO DEVICE FILE TRANSFER SYSTEM FOR LOCAL CLOUD STORAGE FILES

BACKGROUND

1. Field

The disclosure relates generally to an improved computer system, and more specifically, to a method, apparatus, and computer program product for transferring files. Still more particularly, the present disclosure relates to a method, apparatus, and computer program product for transferring copies of files between mobile devices in which the local copies are copies of files that are downloaded from a cloud file storage service.

2. Description of the Related Art

Cloud storage services are currently present that provide online storage repositories for users. A cloud storage service comprises data stored in logical pools. Physical storage for these services may span different servers and locations. The hosting company for cloud storage services keeps the data available and accessible, as well as protecting it. Users, both individuals and organizations, may purchase or lease storage capacity from the cloud storage services.

Clouds storage services may be accessed through a connection to a network, such as the Internet. The advantage of these types of services is that the devices do not need to have large amounts of storage capacity. Additionally, a user may access data from different devices at different locations. Additionally, in addition to storing files for their use, users may share files with other users of the cloud storage service.

SUMMARY

An embodiment of the present disclosure provides for a method, system, and computer program product for transferring files. The system provides for a data transfer system comprising a processor unit and a data transfer manager. The data transfer manager identifies a group of local copies of files, in a cloud storage system, that are stored in a group of mobile devices. The data transfer manager then tracks a location of the group of mobile devices and provides a report of availability of the group of local copies of files on the cloud storage service based on an identification of the group of local copies of files on the cloud storage service that are stored in the group of mobile devices and the location of the group of mobile devices. The method comprises using a computer system to identify a group of local copies of files in a cloud storage service that are stored in a group of mobile devices. The method tracks a location for the group of mobile devices and provides a report of availability for the group of local copies of files on the cloud storage service based on an identification of the group of the local copies of files on the cloud storage service that are stored in the group of mobile devices and the location of the group of mobile devices. The computer program product comprises a computer-readable storage media, a first program code, a second program code, and a third program code, all stored on the computer-readable storage media. The first program code identifies a group of local copies of files in a cloud storage service that are stored in the group of mobile devices. The second program code tracks a location of the group of mobile devices. The third program code provides a report of availability of the group of local copies of files on the cloud storage service based on an identification of the group of local copies of files on the cloud storage service that are stored in the group of mobile devices and the location of the group of mobile devices.

DETAILED DESCRIPTION

Figure 1:
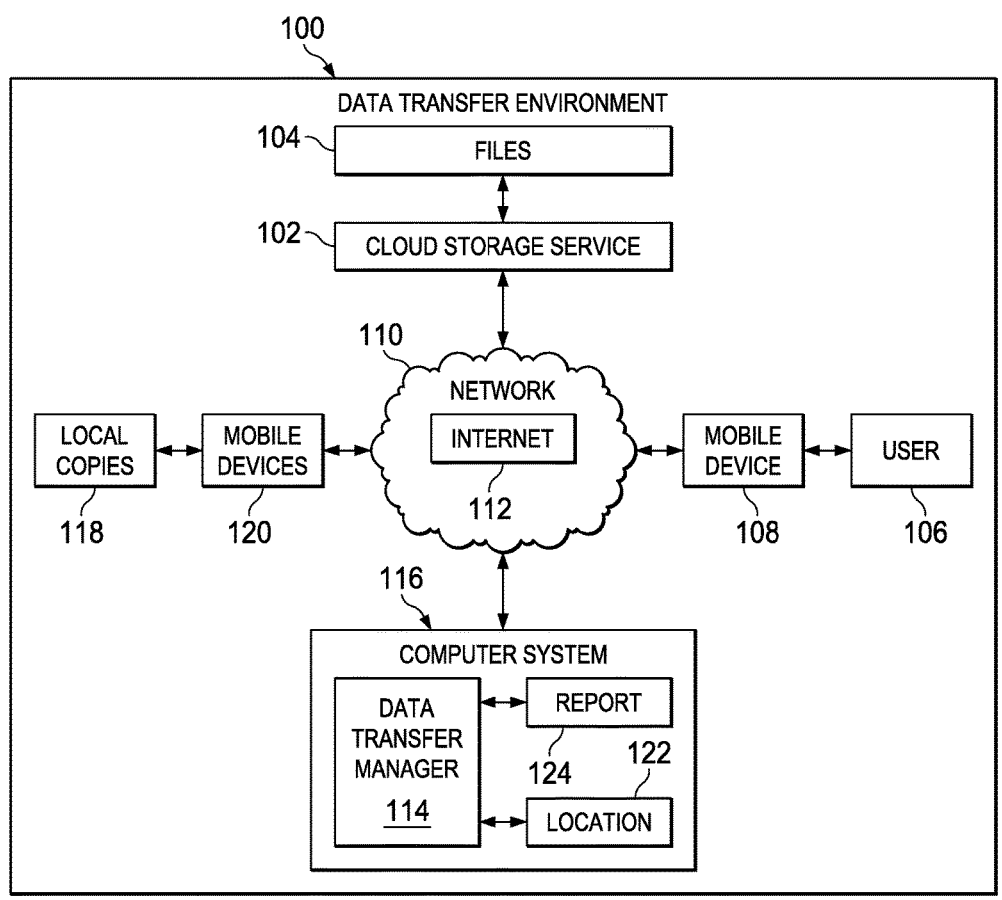
FIG. 1 is a block diagram of a data transfer environment in accordance with an illustrative embodiment.

The present invention may be a system, a method, and/or a computer program product. The computer program product may include a computer-readable storage medium or media having computer-readable program instructions recorded thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to the flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowcharts and block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account that cloud storage services provide increased access to data for users. The illustrative embodiments recognize and take into account that these services, however, may not always be accessible or data may not be accessed as quickly as desired from the services. For example, the illustrative embodiments recognize and take into account an Internet connection or other connection needed to access data in a cloud storage service may not always be available. Also, the speed or bandwidth of these connections to the cloud storage service may be limited. For example, a Wi-Fi network may be too slow to download a large file. In other cases, a Wi-Fi network may be unavailable and a cellular network may be even slower and bandwidth capping may make transferring a file prohibitive. As a result, the illustrative embodiments recognize and take into account that access to data stored in the service may not always be available in the manner desired.

The illustrative embodiments provide a method, apparatus, and computer program product for transferring files. In one example, a computer system identifies a group of local copies of files in a cloud storage service that are stored in a group of mobile devices. The computer system tracks a location of the group of mobile devices and provides a report of availability of the group of local copies of files on the cloud storage service based on an identification of the group of local copies of files on the cloud storage service that are stored in the group of mobile devices and the location of the group of mobile devices.

With reference now to the figures and, in particular, with reference to FIG. 1, a block diagram of a data transfer environment is depicted in accordance with an illustrative embodiment. In this illustrative example, data transfer environment 100 includes cloud storage service 102. As depicted, cloud storage service 102 stores files 104. Files 104 may take various forms. For example, files 104 may be selected from at least one of a document, a text file, a spreadsheet, a presentation file, an image, an audio file, a video file, a program code file, a configuration file, or some other suitable type of file.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In this illustrative example, user 106 accesses files 104 though cloud storage service 102 using mobile device 108. Network 110 provides the ability to access files 104. Network 110 may be Internet 112.

In one illustrative example, access to files 104 stored on cloud storage service 102 may not be available when using Internet 112. For example, Internet 112 may provide access to files 104 that is slower than desired. In other examples, mobile device 108 may be unable to access Internet 112.

In the illustrative example, data transfer manager 114 may aid in facilitating the transfer of files 104 to mobile device 108. For example, data transfer manager 114 may be running on a processor unit in computer system 116. Data transfer manager 114 identifies a group of local copies 118 of files 104 in cloud storage service 102 that are stored in a group of mobile devices 120. As used herein, "a group of", when used with reference to items, means one or more items. For example, a group of local copies 118 is one or more of local copies 118.

Data transfer manager 114 also tracks location 122 of the group of mobile devices 120 and provides report 124 of availability of the group of local copies 118 of files 104 in cloud storage service 102 based on an identification of the group of local copies 118 of files 104 in cloud storage service 102 that are stored in the group of mobile devices 120 and location 122 of the group of mobile devices 120.

Data transfer manager 114 may be implemented in software, hardware, firmware, or a combination thereof. When software is used, the operations performed by data transfer manager 114 may be implemented in program code configured to run on hardware, such as a processor unit. When firmware is used, the operations performed by data transfer manager 114 may be implemented in program code and data, and stored in persistent memory to run on a processor unit. When hardware is employed, the hardware may include circuits that operate to perform the operations in data transfer manager 114.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable types of hardware devices. Additionally, the processes may be implemented in organic components integrated with inorganic components and may be comprised entirely of organic components, excluding a human being. For example, the processes may be implemented as circuits in organic semiconductors.

Computer system 116 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with accessing files stored on a cloud storage service through a network, such as the Internet. As a result, one or more technical solutions may provide a technical effect in files that may be accessed through obtaining local copies of the files stored on the cloud storage services. Mobile devices co-located with the device desiring to receive the file may store these local copies. In other illustrative examples, multiparty transfers may be performed to transfer a file along a path to transfer the local copy of the file from a mobile device on which the local copy is located to the mobile device desiring to receive the files. These types of transfers are direct transfers between mobile devices in contrast to obtaining the files from the cloud storage service using a network connection to a network such as the Internet.

As a result, computer system 116 operates as a special purpose computer system in which data transfer manager 114 in computer system 116 enables transferring one or more local copies of files in a manner that increases at least one of the speed or accessibility of files from cloud storage service 102. In particular, data transfer manager 114 transforms computer system 116 into a special purpose computer system, as compared to currently available general computer systems that do not have data transfer manager 114.

In this manner, data transfer manager 114 may monitor for the downloading of files 104 into mobile devices 120 to form local copies 118. Additionally, data transfer manager 114 may predict when mobile devices 120 with local copies 118 will be co-located with mobile device 108 such that mobile device 108 may transfer one or more of local copies 118 to mobile device 108. This type of information is sent as a notification such as report 124 to user 106 of mobile device 108.

Figure 2:
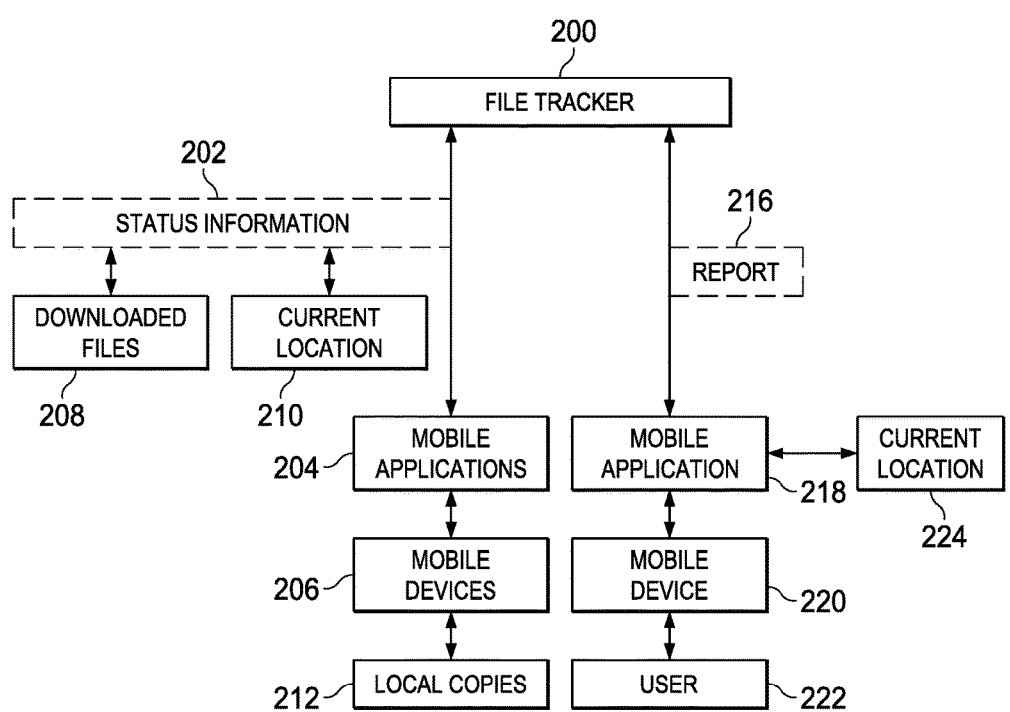
FIG. 2 is an illustration of a dataflow used to predict the availability of a group of local copies of files at a future point in time in accordance with an illustrative embodiment.

Turning to FIG. 2, an illustration of a dataflow used to predict the availability of a group of local copies of files at a future point in time is depicted in accordance with an illustrative embodiment. In this illustrative example, file tracker 200 is an example of a component that may be implemented in data transfer manager 114 in FIG. 1. Mobile applications 204 running on mobile devices 206 sends status information 202 to file tracker 200. As depicted, each of mobile devices 206 sends status information 202 to file tracker 200, and status information 202 includes at least one of a group of local copies 212 or current location 210 for each of mobile devices 206.

With status information 202, file tracker 200 identifies local copies 212 and current locations 210 of mobile devices 206. File tracker 200 generates report 216. Report 216 may be sent to mobile application 218 running on mobile device 220 for user 222. Report 216 identifies an availability of one or more of local copies 212 on mobile devices 206 based on current locations 210 of mobile devices 206 and current location 224 of mobile device 220. The availability is based on an ability to transfer one or more of local copies 212 from mobile devices 206 to mobile device 220 without using a communications medium, such the Internet. Instead, other communications techniques may be used such as Bluetooth, near field communications, infrared communications, light fidelity (Li-Fi) communications, AirDrop, or other suitable types of communications techniques that allow the transfer of one or more of downloaded files 208 on mobile devices 206 to mobile device 220. This type of transfer is often faster than those transfer techniques that transfer files over the Internet or some other network, such as a Wi-Fi network, a local area network, or other wired network typically used to access files stored on the cloud storage service.

Figure 3:
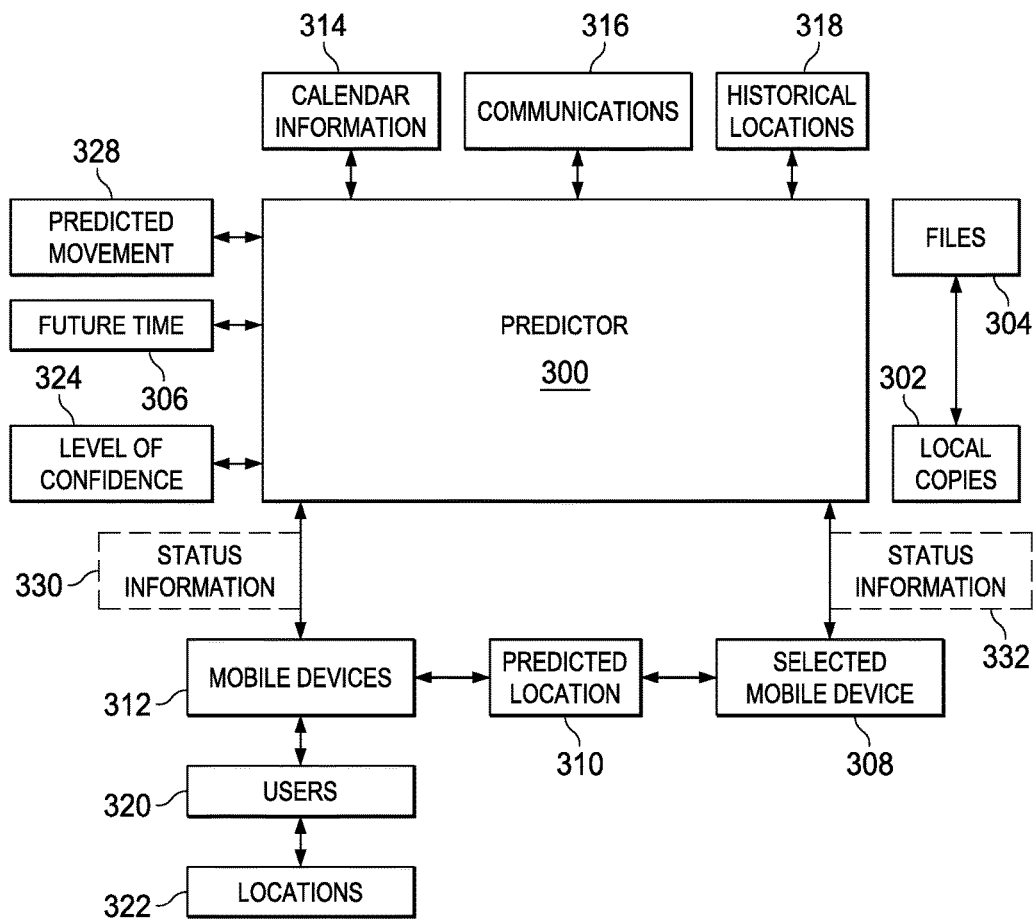
FIG. 3 is an illustration of a dataflow predicting the availability of local copies of files stored in a cloud storage service in accordance with an illustrative embodiment.

With reference now to FIG. 3, an illustration of a dataflow predicting the availability of local copies of files stored in a cloud storage service is depicted in accordance with an illustrative embodiment. Predictor 300 is an example of the component that may be implemented in data transfer manager 114 shown in FIG. 1. In this illustrative example, predictor 300 may take various forms. For example, a cognitive location prediction engine may be used to implement predictor 300.

As depicted, predictor 300 predicts an availability of a group of local copies 302 of files 304 at future time 306 for selected mobile device 308 based on predicted location 310 for at least one of a group of mobile devices 312 or selected mobile device 308 at future time 306. In predicting the availability of the group of local copies 302 of files at future time 306, predictor 300 predicts predicted location 310 for the group of mobile devices 312 and selected mobile device 308 using at least one of calendar information 314, communications 316, or historical locations 318 for the group of mobile devices 312 and selected mobile device 308.

In this example, calendar information 314 provides information used to predict the location of at least one of the group of mobile devices 312 or selected mobile device 308 at future time 306. Calendar information 314 may include entries identifying meetings, activities, and other information that may be used to predict where a user with a mobile device may be located in the future. Communications 316 may also include information about meetings or other activities that occur in the future. Historical locations 318 may be used predict when the user may again be in a particular location in future time 306.

Further, in predicting the availability of the group of local copies 302 of files 304 at future time 306, predictor 300 predicts predicted location 310 for the group of mobile devices 312 based on where a group of users 320 of the mobile devices 312 will be at a group of locations 322 and how long the group of users 320 will be at the group of locations 322. In predicting the availability of the group of local copies 302 of files 304 at future time 306, predictor 300 predicts an availability of the group of local copies 302 of files 304 at future time 306 for selected mobile device 308 based on predicted location 310 for at least one of the group of mobile devices 312 or selected mobile device 308 at future time 306 identifies level of confidence 324 for the availability.

Further, in predicting the availability of the group of local copies 302 of files 304 at future time 306, predictor 300 predicts the availability of the group of local copies 302 of files 304 at future time 306 based on predicted movement 328 of the group of mobile devices 312.

In this illustrative example, predictor 300 makes the predictions using status information 330 received from the group of mobile devices 312 and status information 332 received from selected mobile device 308. As depicted, the status information may include a current location of at least one of the group of mobile devices 312 or selected mobile device 308. In addition, the status information also includes a definition of what files are present on each of mobile devices 312.

Figure 4:
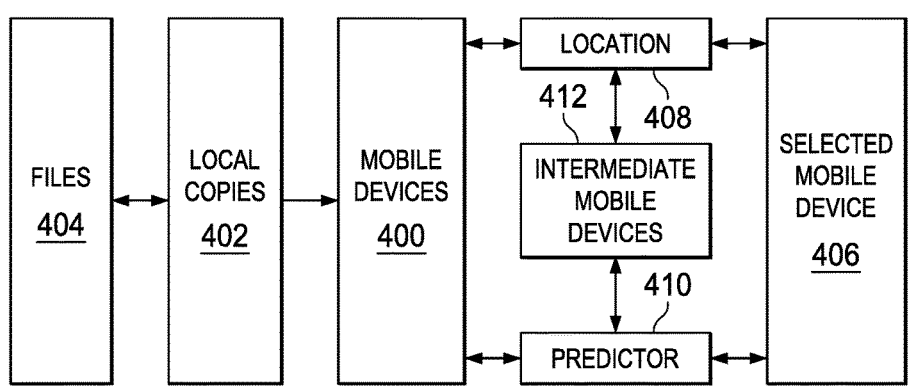
FIG. 4 is an illustration of a dataflow in performing a multiparty transfer of local copies of files in accordance with an illustrative embodiment.

Turning to FIG. 4, an illustration of dataflow in performing a multiparty transfer of local copies of files is depicted in accordance with an illustrative embodiment. In this illustrative example, selected mobile device 406 requests a group of local copies 402 of files 404 on a group of mobile devices 400 having a group of local copies 402. In this illustrative example, the group of local copies 402 of files 404 located on group of mobile devices 400 are not available to selected mobile device 406. In particular, selected mobile device 406 will not be in location 408 at the same time as the group of mobile devices 400 such that a transfer of local copies 402 may be made from the group of mobile devices 400 to selected mobile device 406.

In this instance, predictor 410 is an example of a component that may be implemented in data transfer manager 114 in FIG. 1 to enable the transfer of local copies 402 from the group of mobile devices 400 to selected mobile device 406. With this situation, predictor 410 identifies a group of intermediate devices 412 that will have access to the group of mobile devices 400 and selected mobile device 406 that requests the group of local copies 402 when device access is unavailable between the group of mobile devices 400 and selected mobile device 406. The group of intermediate devices 412 facilitates the transfer of the group of local copies 402 of files 404 from the group of mobile devices 400 to selected mobile device 406.

Figure 5:
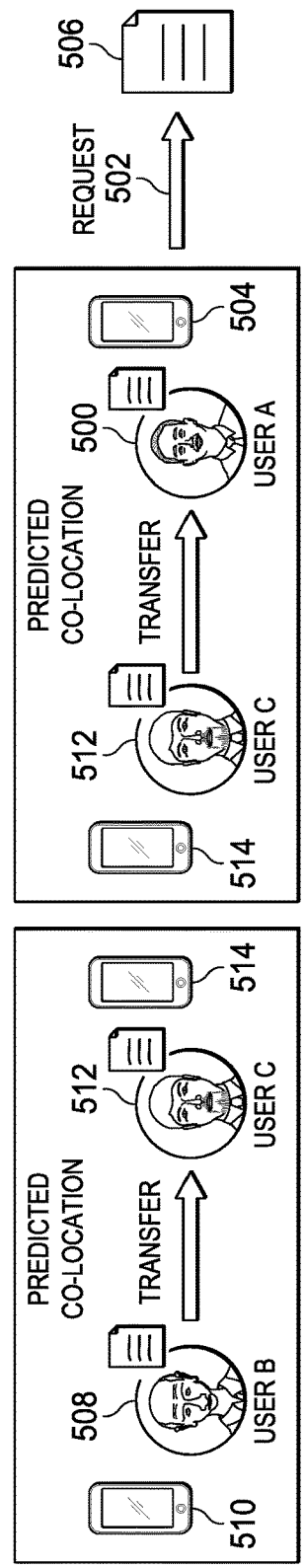
FIG. 5 is another illustration of a dataflow in a multiparty transfer of local copies of files in accordance with an illustrative embodiment.

With reference now to FIG. 5, another illustration of a dataflow in a multiparty transfer of local copies of files is depicted in accordance with an illustrative embodiment. In this example, user 500 sends request 502 from mobile device 504 for local transfer of local copy 506. In other words, local copy 506 is a file that may be transferred without using the normal path or communications medium for accessing a cloud storage service. The transfer may occur without using the Internet or other network.

In this illustrative example, user 500 flags local copy 506 as being unavailable for local transfer from mobile device 504 on which local copy 506, in a cloud storage service, is located. As a result, a multiparty transfer of local copy 506 is performed. For example, local copy 506 may not be on a report indicating an availability of local copy 506 on a mobile device that will be in a location proximate to mobile device 504.

In this illustrative example, a data transfer manager, such as data transfer manager 114 in FIG. 1, identifies all users having mobile devices with a copy of local copy 506 is identified. For example, all the users having local copy 506 on their mobile devices within a particular city, county, state, or some other geographic area may be identified.

After the data transfer manager has identified all of the users, the data transfer manager predicts the movement of the different mobile devices and is made to determine whether these devices will cross paths with other devices that may not have local copy 506 in a manner that allows for a transfer from one device to another device that reaches mobile device 504 for user 500. In other words, the data transfer manager determines whether the devices become located with each other in a manner that allows for transfer of local copy 506 to mobile device 504.

In this example, the data transfer manager identifies that the user 500 with mobile device 504 is located in Raleigh and all other users having local copy 506. The data transfer manager identifies a predicted path of movement of each of the users with local copy 506 is made to determine which other users are predicted to be co-located with user 500 that may participate in the transfer. These other users with their mobile devices are considered intermediate parties that may help facilitate the transfer of local copy 506 from one of the mobile devices identified as having local copy 506 to mobile device 504.

In this example, user 508 with mobile device 510 has local copy 506. User 508 is scheduled to attend a meeting in which user 512 with mobile device 514 will also be present. Later, user 512 will be in the same location as user 500. With the permission of the parties, user 512 of local copy 506 is transferred from mobile device 510 for user 508 to mobile device 514 for user 512. At a later time, local copy 506 is transferred from mobile device 514 for user 512 to mobile device 504 for user 500 when both user 500 with mobile device 504 and user 512 with mobile device 514 are co-located with each other in this example, user 512 with mobile device 514 is the intermediate party in which mobile device 514 is an intermediate mobile device that facilitates the transfer of local copy 506 to mobile device 504.

In this manner, a component such as data transfer manager 114 in FIG. 1 may find a path from a device with the local copy of a file to the user based on the predicted co-location of multiple parties. Intermediate parties and their devices do not have the local copy but may facilitate the transfer of the local copy from a mobile device to the user with the mobile device requesting the local copy. This type of process may be used when a file is marked as currently not available through a direct transfer from a mobile device having the local copy to the mobile device requesting a copy.

Figure 6:
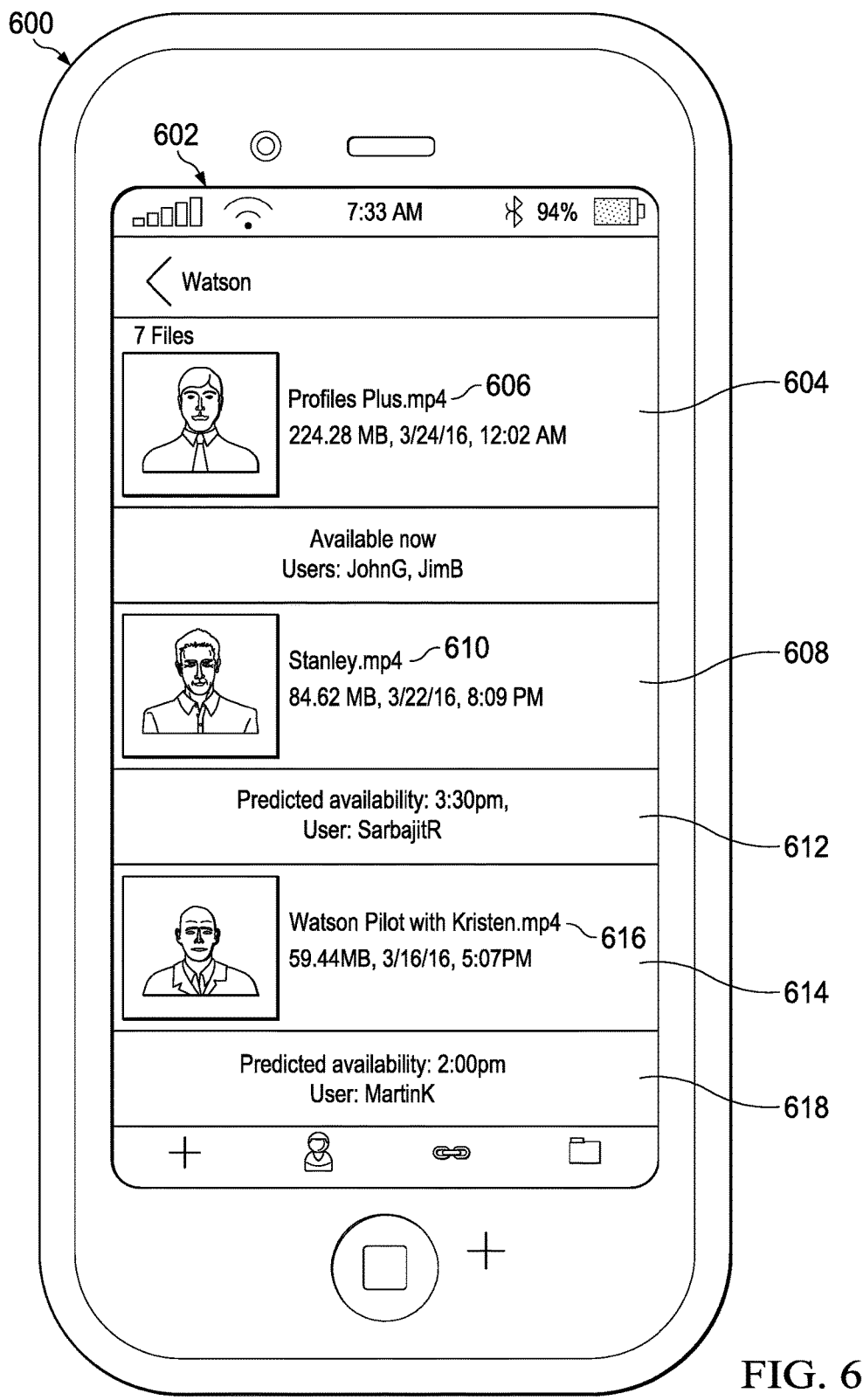
FIG. 6 is an illustration of a report indicating availability of local files in accordance with an illustrative embodiment.

With reference now to FIG. 6, an illustration of a report indicating availability of local files is depicted in accordance with an illustrative embodiment. In this illustrative example, display 600 displays report 602 on a mobile device, such as mobile device 108 in FIG. 1. Report 602 is an example of one manner in which report 124, shown in block form in FIG. 1, may be displayed. Report 602 shows when different files will be available locally on other mobile devices that are or will be located with the mobile device for transferring files. This transfer may be performed using communications media other than a network. For example, a Bluetooth connection, an infrared connection, a peer-to-peer wireless connection, or other suitable type of connection may be used to transfer the local copies of files. This transfer may be made more quickly than accessing those on the cloud storage service using a network, such as the Internet.

In this illustrative example, entry 604 in report 602 shows that file 606 is currently available for transfer. In this case, the device to device transfer of file 606 may be made.

Entry 608 shows that file 610 is currently not available. Entry 608 shows predicted availability 612 for file 610 as being available at 3:30 PM today. Entry 614 shows that file 616 is also currently unavailable. Entry 614 shows predicted availability 618 for file 616 at 2:00 PM today. In this manner, the user may identify when local copies of files stored for the user on a cloud storage service may be accessed quickly, then using a network, such as the Internet, to access those files from the cloud storage service.

The illustration of data transfer environment 100 of FIG. 1 and the different components shown in FIGS. 1-6 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, network 110 may take other forms in addition to or in place of Internet 112. For example, network 110 may be selected from at least one of an intranet, a local area network, a wide area network or some other network, in addition or in place of Internet 112.

Figure 7:
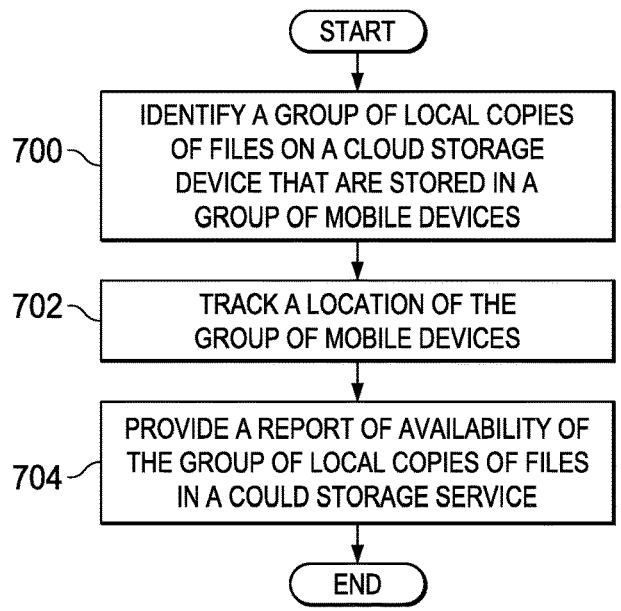
FIG. 7 is a flowchart of a process for transferring files in accordance with an illustrative embodiment.

Turning next to FIG. 7, a flowchart of a process for transferring files is depicted in accordance with an illustrative embodiment. The process illustrated in this figure may be located in data transfer manager 114 of FIG. 1, using instructions for processes that are implemented at least one of a program code, firmware, or hardware.

The process begins by identifying a group of local copies of files on a cloud storage service that are stored in a group of mobile devices (step 700). The process tracks a location of the group of mobile devices (step 702). The process provides a report of availability of the group of local copies of files in a cloud storage service (step 704) with the process terminating thereafter. The report is based on an identification of the group of local copies of files on the cloud storage service that are stored in the group of mobile devices and a location of the group of mobile devices.

Figure 8:
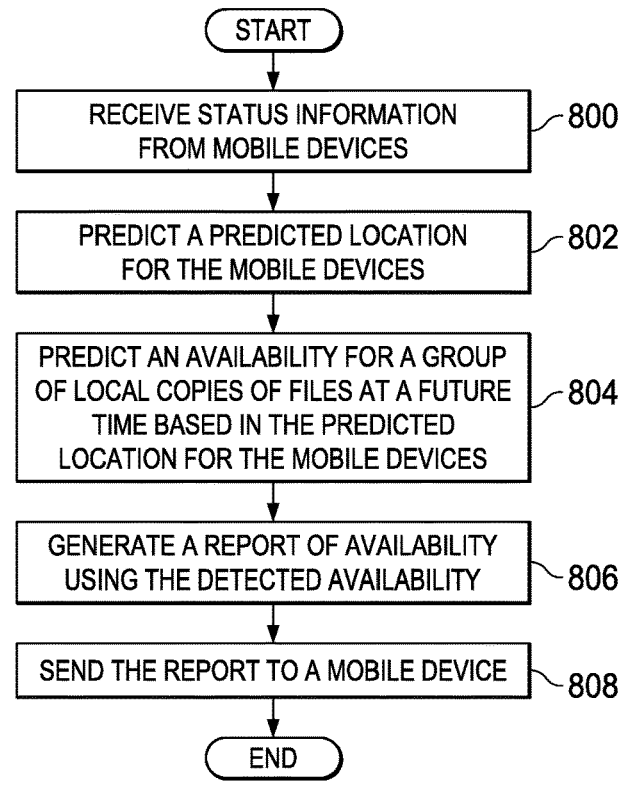
FIG. 8 is a flowchart of a process for predicting an availability of local files in accordance with an illustrative embodiment.

With reference next to FIG. 8, a flowchart of a process for predicting an availability of local files is depicted in accordance with an illustrative embodiment. The process illustrated in this figure may be located in data transfer manager 114 of FIG. 1, using instructions for processes that are implemented at least one of program code, firmware, or hardware.

The process begins by receiving status information from mobile devices (step 800). The status information may include information identifying local copies of files stored on the cloud storage service. The status information also includes a current location of the mobile devices.

The process predicts a predicted location for the mobile devices (step 802). This predicted location identifies the location of each mobile device in the mobile devices that are being tracked or monitored.

The predicted location for the mobile devices maybe based on the status information and other information. For example, the process may use calendar information, communications, and historical locations for mobile devices in predicting the predicted location for the mobile devices at a future time.

The process predicts an availability for a group of local copies of files at a future time based on the predicted location for the mobile devices (step 804). The predicted availability is based on which mobile devices will be co-located with other mobile devices at different future times. Then an availability maybe present for different times in the future for different local copies of the files.

The process generates a report of availability using the detected availability (step 806). The report may be similar to report 602 shown in display 600 in FIG. 6. The process sends the report to a mobile device (step 808) with the process terminating thereafter.

Figure 9:
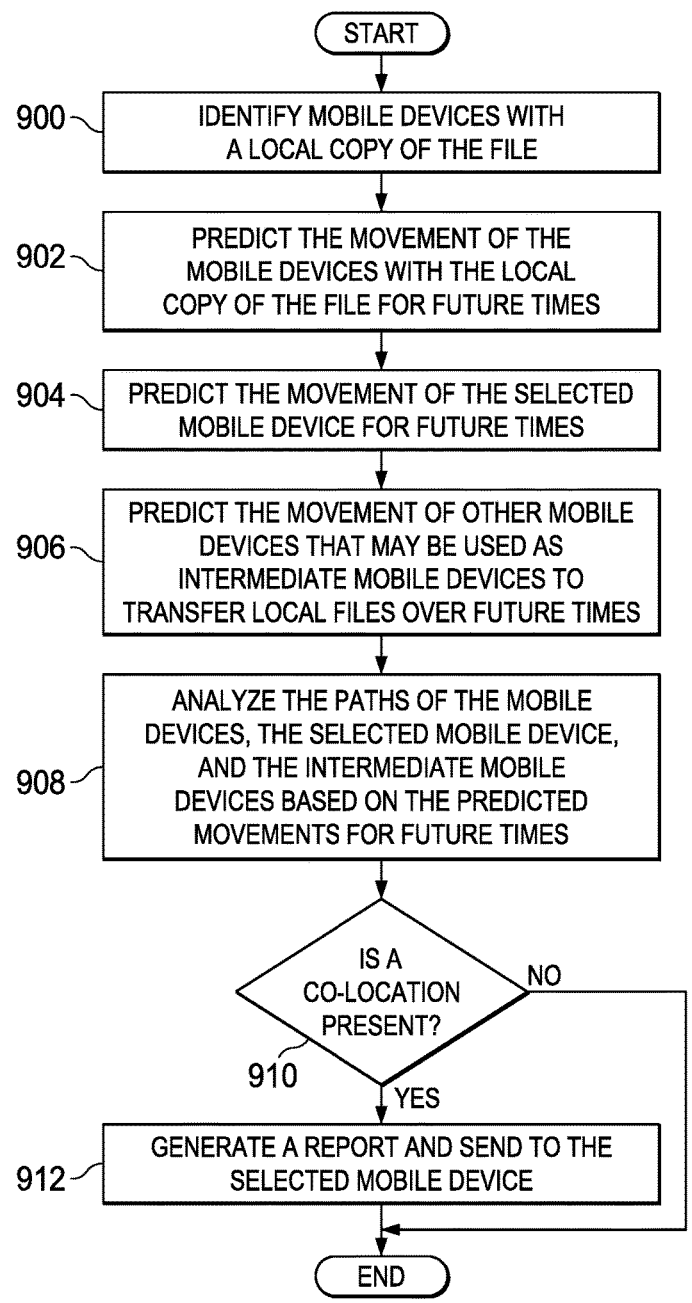
FIG. 9 is a flowchart of a process for a third-party transfer of local copies of files in accordance with an illustrative embodiment.

With reference next to FIG. 9, a flowchart of a process for a third-party transfer of local copies of files is depicted in accordance with an illustrative embodiment. The process illustrated in this figure may be located in data transfer manager 114 of FIG. 1, using instructions for processes that are implemented at least one of program code, firmware, or hardware.

The process begins by identifying mobile devices with a local copy of the file (step 900). The mobile devices may be identified as ones in a particular region. The region may be defined in a number different ways. For example, the region may be a distance from a mobile device. In another example, the region may be a geographic region such as a city, county, state, country, or other geographic region.

The process then predicts the movement of the mobile devices with the local copy of the file for future times (step 902). The process predicts the movement of the selected mobile device for future times (step 904). The selected mobile device is a mobile device that has requested or may request the local copy of the file. The process also predicts the movement of other mobile devices that may be used as intermediate mobile devices to transfer local files over future times (step 906).

The process analyzes the paths of the mobile devices, the selected mobile device, and the intermediate mobile devices based on the predicted movements for future times (step 908). A determination is made as to whether co-location is present that allows for a transfer of the local file from one of the mobile devices to the selected mobile device via one or more of the intermediate mobile devices (step 910).

If co-location is present, a report is generated and sent to the selected mobile device (step 912) with the process terminating thereafter. In another illustrative example, the process may initiate the transfer at each mobile device as mobile devices or co-located with each other to transfer the local file. With reference again to step 908, if co-location is not present the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
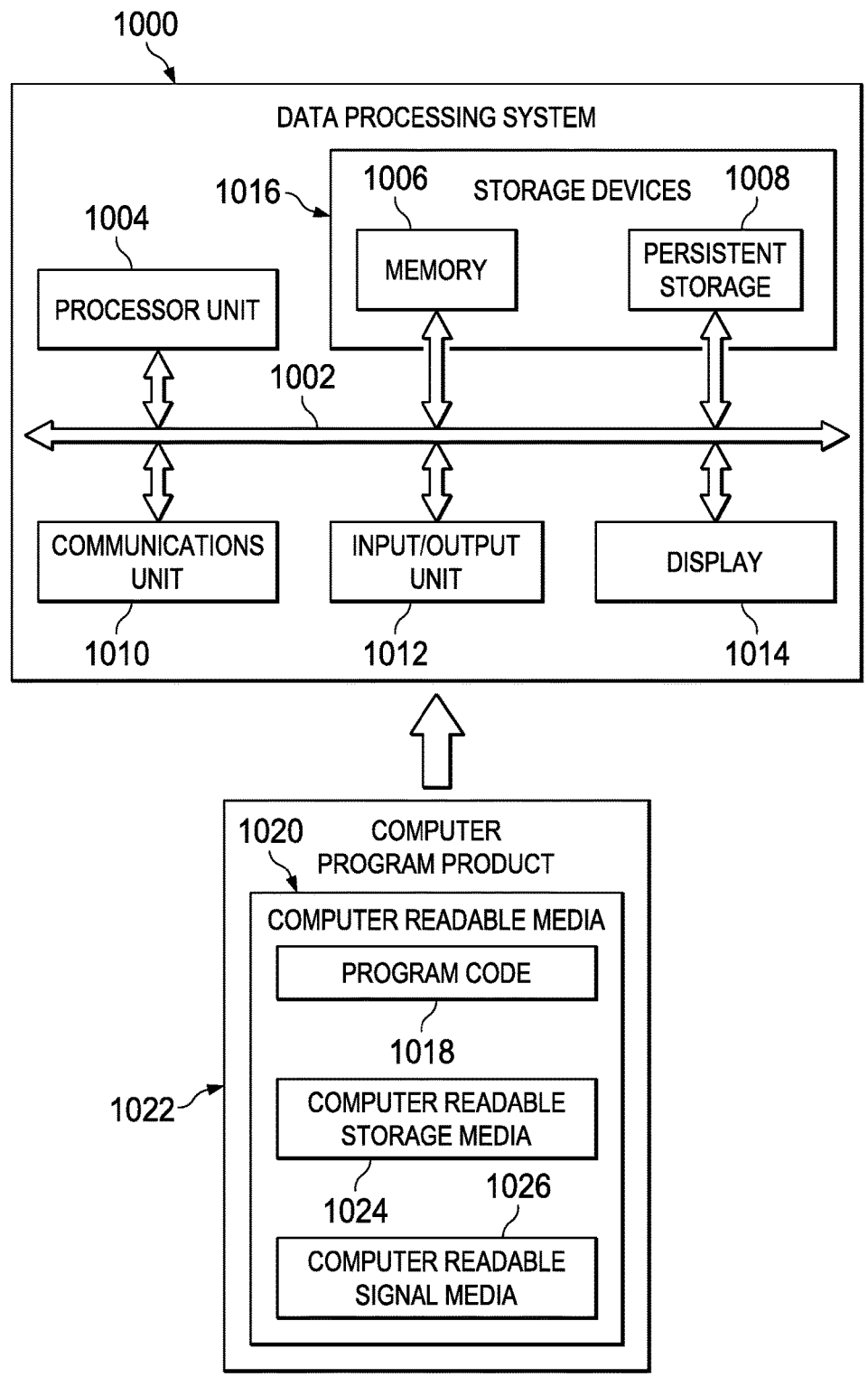
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement mobile device 108, computer system 116, and mobile devices 120 in FIG. 1. Data processing system 1000 also may be used to implement mobile devices 206 in FIG. 2, mobile device 220 in FIG. 2, selected mobile device 308 in FIG. 3, mobile devices 312 in FIG. 3, mobile devices 400 in FIG. 4, selected mobile device 406 in FIG. 4, intermediate devices 412 in FIG. 4, mobile device 504 in FIG. 5, mobile device 510 in FIG. 5, and mobile device 514 in FIG. 5. In this illustrative example, data processing system 1000 includes communications framework 1002, which provides communications between processor unit 1004, memory 1006, persistent storage 1008, communications unit 1010, input/output unit 1012, and display 1014. In this example, communication framework may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid state hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, illustrative embodiments of the present invention provide a computer implemented method, computer system, and computer program product for transferring files. The system provides for a data transfer system comprising a processor unit and a data transfer manager. The data transfer manager identifies a group of local copies of files, in a cloud storage system, that are stored in a group of mobile devices. The data transfer manager then tracks a location of the group of mobile devices and provides a report of availability of the group of local copies of files on the cloud storage service based on an identification of the group of local copies of files on the cloud storage service that are stored in the group of mobile devices and the location of the group of mobile devices. The report of availability may be used for direct transfers between mobile devices such that a selective mobile device desiring a file from the cloud storage service may obtain a local copy of the file from another mobile device directly without using a network.

One or more of the illustrative examples provided technical solution for accessing files stored on a cloud storage system when access through a network such as the Internet, does not provide a desired level of performance. In the illustrative examples, mobile devices may transfer local copies of files when their co-located in a manner that allows for quicker access than may be available through the Internet. Further, when access is present, this type of transfer of files by co-located mobile devices may be quicker than that provided through the Internet or other types of networks. This type of transfer is a direct transfer between mobile devices as compared to using a network such as the Internet.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A data transfer system comprising:
   a processor unit; and
   a data transfer manager running on the processor unit, wherein the data transfer manager:
   identifies a group of local copies of files in a cloud storage service that are stored in a group of mobile devices;
   tracks a location of the group of mobile devices;
   provides a report of availability of the group of local copies of files on the cloud storage service based on an identification of the group of local copies of files on the cloud storage service that are stored in the group of mobile devices and the location of the group of mobile devices; and
   predicts an availability of the group of local copies of files at a future time for a selected mobile device based on a predicted location for at least one of the group of mobile devices or the selected mobile device at the future time;
   wherein in predicting the availability of the group of local copies of files at the future time, the data transfer manager predicts the predicted location for the group of mobile of locations.

2. The data transfer system of claim 1, wherein in predicting the availability of the group of local copies of files at the future time, the data transfer manager predicts the predicted location for the group of mobile devices and the selected mobile device using at least one of calendar information, communications, or historical locations for the group of mobile devices and the selected mobile device.

3. The data transfer system of claim 1, wherein in predicting the availability of the group of local copies of files at the future time, the data transfer manager predicts the availability of the group of local copies of files at the future time for the selected mobile device based on the predicted location for at least one of the group of mobile devices or the selected mobile device at the future time and identifies a level of confidence for the availability.

4. The data transfer system of claim 1, wherein in predicting an availability of the group of local copies of files at the future time, the data transfer manager predicts the availability of the group of local copies of files at the future time based on a predicted movement of the group of mobile devices.

5. The data transfer system of claim 1, wherein the data transfer manager identifies a group of intermediate devices that will have access to the group of mobile devices and a selected mobile device that requests the group of local copies of files when device access is unavailable between the group of mobile devices and the selected mobile device and initiates a transfer of the group of local copies of files from the group of mobile devices to the selected mobile device via the group of intermediate devices.

6. A method for transferring files, the method comprising:
   identifying, by a computer system, a group of local copies of files in a cloud storage service that are stored in a group of mobile devices;
   tracking, by the computer system, a location of the group of mobile devices;
   providing, by the computer system, a report of availability of the group of local copies of files on the cloud storage service based on an identification of the group of local copies of files on the cloud storage service that are stored in the group of mobile devices and the location of the group of mobile devices; and
   predicting, by the computer system, an availability of the group of local copies of files at a future time for a selected mobile device based on a predicted location for at least one of the group of mobile devices or the selected mobile device at the future time;
   wherein predicting the availability of the group of local copies of files at the future time comprises: predicting the predicted location for the group of mobile devices based on where a group of users of the group of mobile devices will be at a group of locations.

7. The method of claim 6, wherein predicting the availability of the group of local copies of files at the future time comprises:
   predicting the predicted location for the group of mobile devices and the selected mobile device using at least one of calendar information, communications, or historical locations for the group of mobile devices and the selected mobile device.

8. The method of claim 6, wherein predicting the availability of the group of local copies of files at the future time comprises:
   predicting the availability of the group of local copies of files at the future time for the selected mobile device based on the predicted location for at least one of the group of mobile devices or the selected mobile device at the future time; and
   identifying a level of confidence for the availability.

9. The method of claim 6, wherein predicting an availability of the group of local copies of files at the future time comprises:
   predicting wherein the availability of the group of local copies of files at the future time based on a predicted movement of the group of mobile devices.

10. The method of claim 6 further comprising:
    identifying a group of intermediate devices that will have access to the group of mobile devices and the selected mobile device that requests the group of local copies of files when device access is unavailable between the group of mobile devices and the selected mobile device; and
    initiating transfer of the group of local copies of files from the group of mobile devices to the selected mobile device via the group of intermediate devices.

11. A computer program product for transferring files, the computer program product comprising:
    a computer-readable storage media;
    first program code, stored on the computer-readable storage media, for identifying, by a computer system, a group of local copies of files of in a cloud storage service that are stored in a group of mobile devices;
    second program code, stored on the computer-readable storage media, for tracking a location of the group of mobile devices;
    third program code, stored on the computer-readable storage media, for providing a report of availability of the group of local copies of files on the cloud storage service based on an identification of the group of local copies of files on the cloud storage service that are stored in the group of mobile devices and the location of the group of mobile devices; and
    fourth program code, stored on the computer-readable storage media, for predicting an availability of the group of local copies of files at a future time for a selected mobile device based on a predicted location for at least one of the group of mobile devices or the selected mobile device at the future time;
    wherein the fourth program code comprises: program code, stored on the computer-readable storage media, for predicting the predicted location for the group of mobile devices based on where a group of users of the group of mobile devices will be at a group of locations.

12. The computer program product of claim 11, wherein the fourth program code comprises:
    program code, stored on the computer-readable storage media, for predicting the predicted location for the group of mobile devices and the selected mobile device using at least one of calendar information, communications, or a historical location for the group of mobile devices and the selected mobile device.

13. The computer program product of claim 11, wherein the fourth program code comprises:
    program code, stored on the computer-readable storage media, for predicting the availability of the group of local copies of files at the future time for the selected mobile device based on the predicted location for at least one of the group of mobile devices and the selected mobile device at the future time; and
    program code, stored on the computer-readable storage media, for identifying a level of confidence for the availability.

14. The computer program product of claim 11 further comprising:
    fifth program code, stored on the computer-readable storage media, for identifying a group of intermediate devices that will have access to the group of mobile devices and the selected mobile device that requests the group of local copies of files when device access is unavailable between the group of mobile devices and a selected mobile device; and sixth program code, stored on the computer-readable storage media, for initiating transfer of the group of local copies of files from the group of mobile devices to the selected mobile device via the group of intermediate devices.

\* \* \* \* \*